United States Patent
Buehler et al.

(10) Patent No.: US 8,806,185 B2
(45) Date of Patent: Aug. 12, 2014

(54) SYSTEM AND METHOD FOR AUTOMATIC CONFIGURATION OF PORTAL COMPOSITE APPLICATIONS

(75) Inventors: Dieter Buehler, Tuebingen (DE); Walter Haenel, Holzgerlingen (DE); Izidor Jager, Jettingen (DE); Michael Marks, Kirchheim-Teck (DE)

(73) Assignee: International Business Machines Corporation, Armonk, NY (US)

( * ) Notice: Subject to any disclaimer, the term of this patent is extended or adjusted under 35 U.S.C. 154(b) by 1083 days.

(21) Appl. No.: 12/128,922

(22) Filed: May 29, 2008

(65) Prior Publication Data

US 2009/0300341 A1 Dec. 3, 2009

(51) Int. Cl.
G06F 9/00 (2006.01)
G06F 9/24 (2006.01)
G06F 15/177 (2006.01)
G06F 1/24 (2006.01)
G06F 3/00 (2006.01)
G06F 9/44 (2006.01)

(52) U.S. Cl.
USPC ............. 713/1; 713/100; 715/751; 717/121

(58) Field of Classification Search
CPC ...... G06F 9/44505; H04L 67/18; H04L 67/34
USPC ............. 713/1, 100; 707/829; 717/107, 121; 715/751, 753, 760
See application file for complete search history.

(56) References Cited

U.S. PATENT DOCUMENTS

| | | | |
|---|---|---|---|
| 2005/0085937 A1 | 4/2005 | Goodwin et al. | |
| 2006/0165123 A1 | 7/2006 | Jerrard-Dunne et al. | |
| 2007/0016615 A1* | 1/2007 | Mohan et al. | 707/104.1 |
| 2007/0050756 A1* | 3/2007 | Paller | 717/117 |
| 2007/0168060 A1* | 7/2007 | Nixon et al. | 700/83 |
| 2007/0276948 A1* | 11/2007 | Burdett et al. | 709/228 |
| 2008/0184200 A1* | 7/2008 | Burns et al. | 717/121 |
| 2008/0235261 A1* | 9/2008 | Malek et al. | 707/102 |
| 2009/0157872 A1* | 6/2009 | Pinkston et al. | 709/224 |
| 2009/0177684 A1* | 7/2009 | Williamson | 707/103 R |

FOREIGN PATENT DOCUMENTS

TW 200719182 A 5/2007

* cited by examiner

Primary Examiner — Kim Huynh
Assistant Examiner — Brandon Kinsey
(74) Attorney, Agent, or Firm — Ryan Lewis; Hoffman Warnick LLC

(57) ABSTRACT

The present invention is directed to the automatic configuration of portal composite applications. A method for automatic configuration of a portal composite application including a portal composite application infrastructure, wherein configuration parameters are managed within a composite application interface of the portal, which interface defines a runtime behavior of instances of the composite application within a predetermined range of variability, and wherein each parameter defines a respective point of variability, includes: storing a collection of parameter values for each of the points of variability; defining a functional component cooperating with the composite application and having read access to the collection of parameter values; invoking the functional component after or at instantiation time of the composite application, yielding a configuration parameter value; including the configuration parameter value into a control for an instance of the composite application; and automatically configuring the instance of the composite application with the included configuration parameter value.

15 Claims, 8 Drawing Sheets

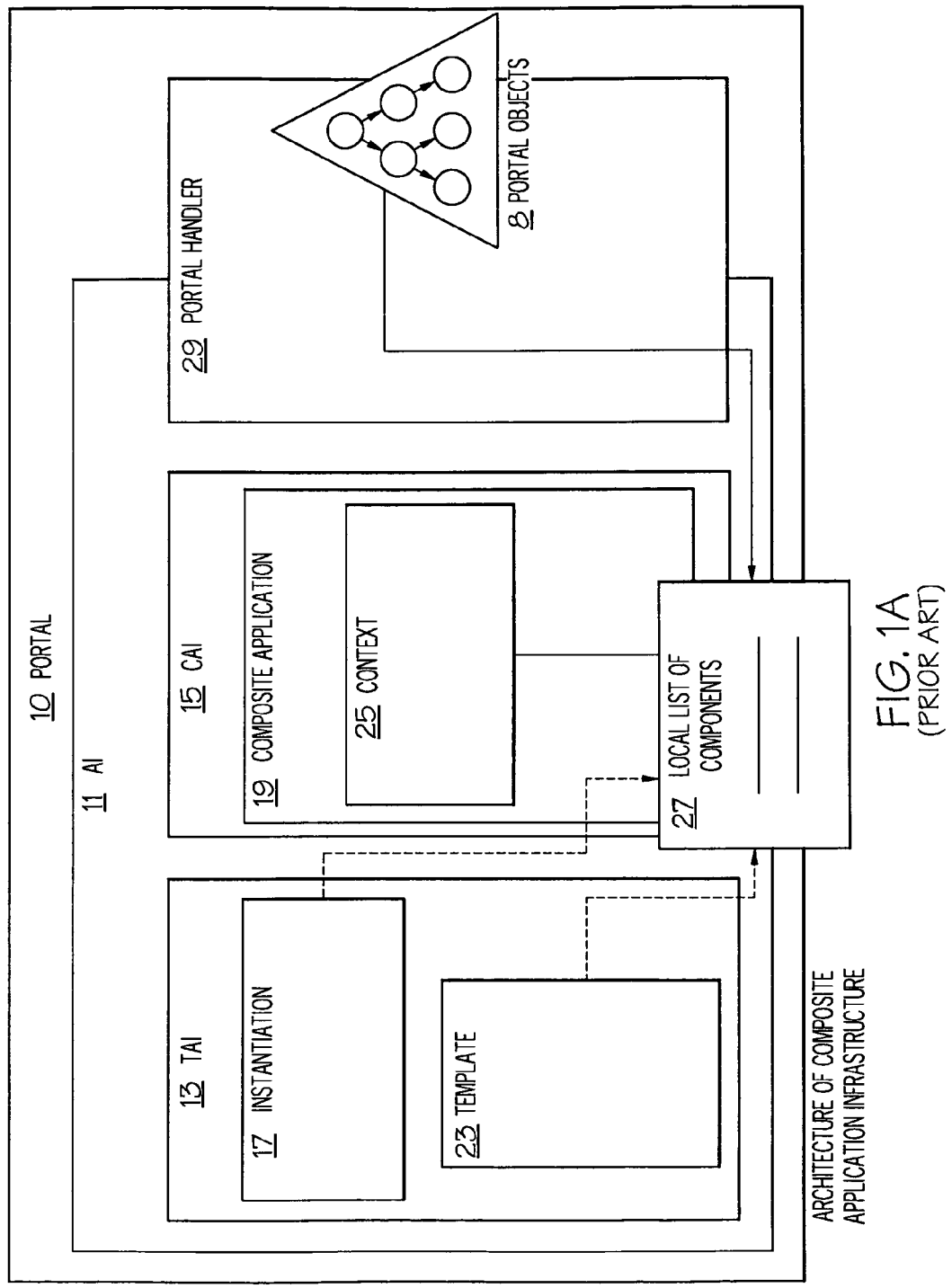

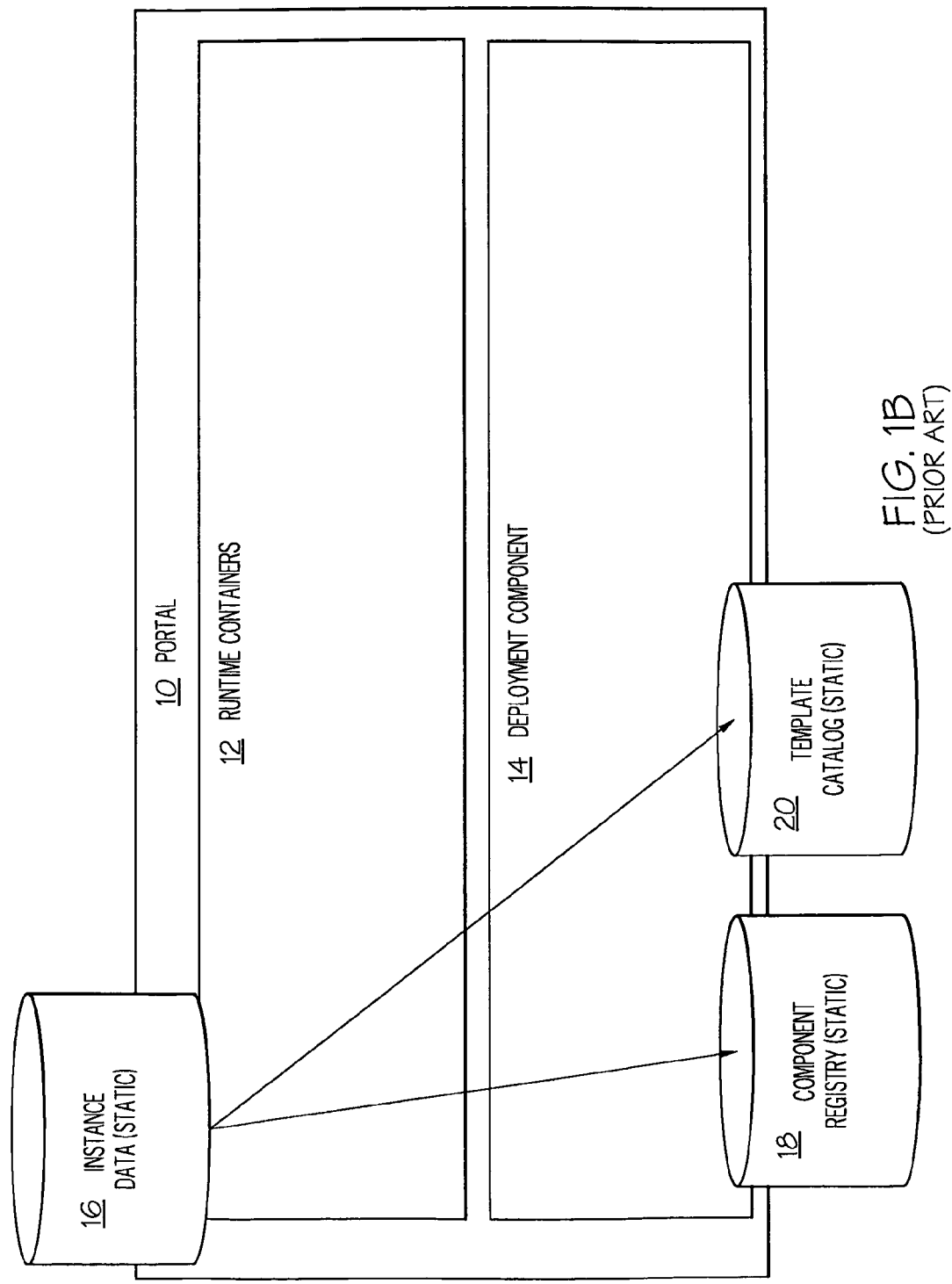

SYSTEM AND METHOD FOR AUTOMATIC CONFIGURATION OF PORTAL COMPOSITE APPLICATIONS

FIELD OF THE INVENTION

The present invention relates to the field of network portals and in particular to a method and system for automatic configuration of portal composite applications (CA), wherein configuration parameters are defined within a composite application template. These parameters in turn define the runtime behavior of the composite application within a predetermined range of variability, and each parameter defines a respective own point of variability.

RELATED ART

In this field, the term "composite application" defines an application hosted on a web portal platform which is built by combining and connecting multiple components such as portlets, wikis, document libraries, and web services, for a particular purpose such as a shop or a virtual team room application. A single portal platform may host multiple instances of the same composite application, for example different team rooms for different associated user communities. Composite applications are built from a template describing the contained components and their set-up and interconnection.

FIG. 1A shows an overview of the components that build up the prior art application infrastructure (AI) 11, within an overall portal system 10. The application infrastructure 11 comprises:
  the templating application infrastructure (TAI) 13 that handles the templates in the system and the creation of new composite applications;
  the composite application infrastructure (CAI) 15 that handles the application instances 19 during runtime and manages connections and the data flow between the components of an application;
  the component registry 27 that manages the business components installed in the system; and
  the portal handler 29, which is a specific local component that manages any portal related artifacts 8 like pages or portlets for the application infrastructure in the portal, and which is used by the instantiation component 17 to create such artifacts during the creation of a new composite application.

The TAI 13 manages the templates 23 in the system which contain references to instantiable components in a local list of components 27. As an example, a template for shopping applications could consist of a reference to a document library component which is used to hold the available goods and their descriptions, a shop portlet that lets clients process actual shopping transactions, an invoice business component that handles the payment process and a blogging component that allows clients to comment on their satisfaction.

The TAI component 13 also creates application instances from the templates via an instantiation component 17, which creates separate instances of the referenced business components, typically by creating or copying individual configurations for these components such that multiple application instances can be created from the same template without interfering with each other.

For the above mentioned sample template, the instantiation component 17 would, among other things, create an individual storage compartment in the document library, an individual configuration of the invoice component referring to the bank account and an individual configuration for the shop portlet that is set up to display goods from the created document library and to delegate payment processing to the created invoice component instance.

In particular, the instantiation component 17 needs to create the necessary portal artifacts like pages that allow interaction with the created composite application, which is typically done by employing a specific handler 29 that creates those portal artifacts 8 and links them with the business components of the application.

The created composite application instances 19 hold a context 25 that lists the component instances that make up the composite application FIG. 1B shows an overview of the storage components involved in the portal system 10 that comprises deployment related code in a deployment component 14 and a runtime environment in one or more runtime containers 12 where the deployed components are executed.

For the composite application context deployed artifacts are:
  application components stored in a component registry 18; and
  templates stored in a template catalog 20.

This data is then referenced by the application's instance specific data 16.

Prior art composite applications are a key concept of prior art Service Oriented Architecture. They allow end-users to assemble business logic out of a set of given components without programming by simply defining some meta information, such as configuration data and application structure.

Prior art composite applications are supported, for example, by IBM WebSphere Portal and other known products.

FIG. 2 illustrates a prior art composite applications configuration based on parameters. Composite applications are supported in WebSphere Portal by the extension called Application Infrastructure (AI) 11. It provides a way to create portal application instances based on predefined templates. A template defines business components, application roles which specify permissions for the included components and parameters 54 which are typically specified during the creation of an application instance (FIG. 1). The usage of parameters allows configuring the appearance and behaviour of the created application. Therefore one template can be used to create multiple flavours of one application type.

In the prior art, the only way to set application parameter values is either by defining them ahead of time within the application template or have them resolved at the instantiation by the application creator. This approach has several limitations. For example, there is no means to predefine parameter values outside the template and to reuse this information from applications created from different application templates. Further, there is no means for applying access control on individual parameter values e.g., as required by corporate security policies, and there is no means to automatically leverage external knowledge about infrastructure environment details (e.g., server names, mail group name, etc.) which are often required by the application instances, resulting in the application creators having to specify these values during application creation. The individual users supposed to actually create these applications instances are typically lacking the required knowledge about those environment parameters. In addition, there is no support for consistently propagating changes in the environment to the affected application instances (e.g., changes of server names, etc.)

A sample scenario relates to an intended change of a server address of a document server for the above-mentioned team room composite applications. The customer installs a composite application that provides team room functionality including the feature to share documents within the application's user community. The application is designed to handle the link to the document server hosting the individual documents as a configuration parameter (a so-called point of variability (POV)). Over time, numerous application entities get instantiated from the corresponding team room template comprised of the team room composite application.

Now, it is assumed that the document server needs to be moved to a different location. In today's composite application environments, the managers of the individual team room composite applications all need to manually update the reference to the new document server. The individual steps necessary in prior art are depicted in FIG. 3, and are as follows:

1) Provide documentation on how to change the reference to the new document server;
2) Determine the list of managers for the affected team room application instances;
3) Send a note to all those managers containing the documentation created in step 1;
4) The individual managers then have to read and understand the documentation and execute the steps described there;
5) The individual managers manually execute the necessary configuration steps;
6) In case of errors the individual managers will contact the help desk; and
7) The help desk needs to be informed about this task and needs to be able to give guidance to those managers that ran into problems.

Disadvantageously, to follow the before-described sequence of steps represents a considerable overall effort for the corporate staff and is additionally also an error prone activity, and will thus require often an additional help desk support.

SUMMARY OF THE INVENTION

The present invention provides a method and system for automatic configuration of portal composite applications. In accordance with the present invention, a dynamic resolution of parameter values is used to provide a more flexible usage of application parameters, and does not require the application creator to know all values of the POVs at initialization time. This inventional approach thereby allows a separation of concerns regarding the management of applications, the infrastructure management and the access control configuration.

Dynamic values of parameters are determined based on business rules evaluated against a central configuration policy component. Rules can be established in a bidirectional fashion to map individual application parameters to individual policy values, and to map changes in specific policy values back into corresponding application parameter values.

According to an aspect of the present invention, a method and respective system for configuring a portal composite application comprising a portal composite application infrastructure is disclosed, wherein configuration parameters are managed within a composite application template, which defines a runtime behavior of instances of the composite application within a predetermined range of variability, and wherein each configuration parameter defines a respective point of variability (POV), the method comprising: storing a collection of parameter values for each POV, wherein each POV is mapped to a policy data structure; defining and/or using a predefined functional component, with inherent logic, cooperating with the composite application and having read access to the collection of POV parameter values; invoking the functional component using a control parameter communicated to the functional component, after or at instantiation time of the composite application, yielding a configuration parameter value; including the configuration parameter value into a control for the composite application, and automatically configuring the composite application with the included configuration parameter.

This method processes thus an automatic configuration of composite applications.

A first technique for defining rule based mappings between application parameters and policy values comprises a "parameter to policy" mapping. With such a mapping, an inventional logical component referred to as "rules engine" will be queried for the best matching value for a given application parameter. The query will be parameterized by meta-data associated with the composite application defining the parameter (e.g., application name, application category, application manager) and the parameter name and type. The rules engine will determine the best matching policy based on the current rule basis and extract the corresponding value from that policy.

Another technique for defining rule based mappings between application parameters and policy values comprises a "policy to parameter" mapping. With such a mapping, the policy infrastructure will trigger updating existing application parameters whenever specific policy values are modified. The set of parameters that shall be updated due to a change of a specific policy value is determined by querying the rules engine for the matching application parameters. The query will be parameterized by meta-data associated with the policy containing the policy value (e.g., policy name, policy category) and the policy value name.

Any change of a parameter will be automatically forwarded to the different composite applications, controlled by the policy component, and after processing by the rules engine.

BRIEF DESCRIPTION OF THE DRAWINGS

The present invention is illustrated by way of example and is not limited by the shape of the figures of the drawings.

FIGS. 1A and 1B illustrate the basic structural components of a prior art hardware and software environment used for a prior art method at a portal site.

DETAILED DESCRIPTION OF THE INVENTION

Figure 2:
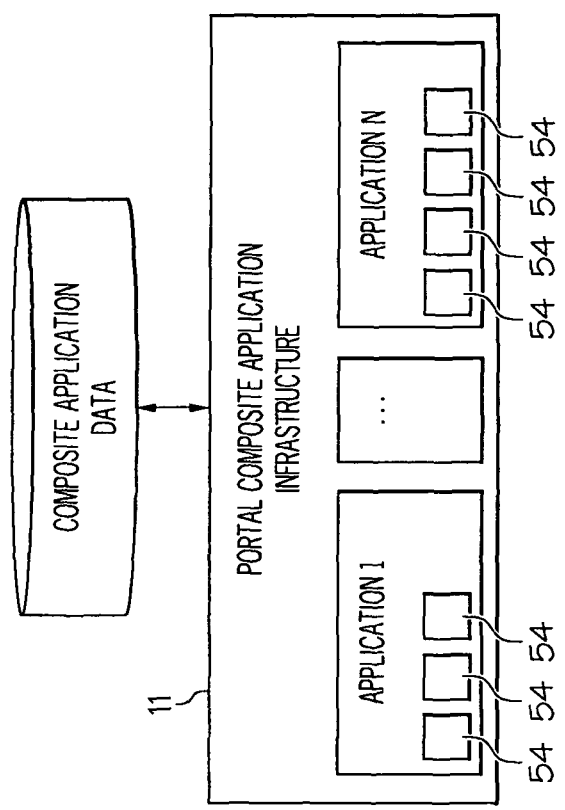
FIG. 2 illustrates the basic prior art structural components involved in prior art policy management.
Figure 3:
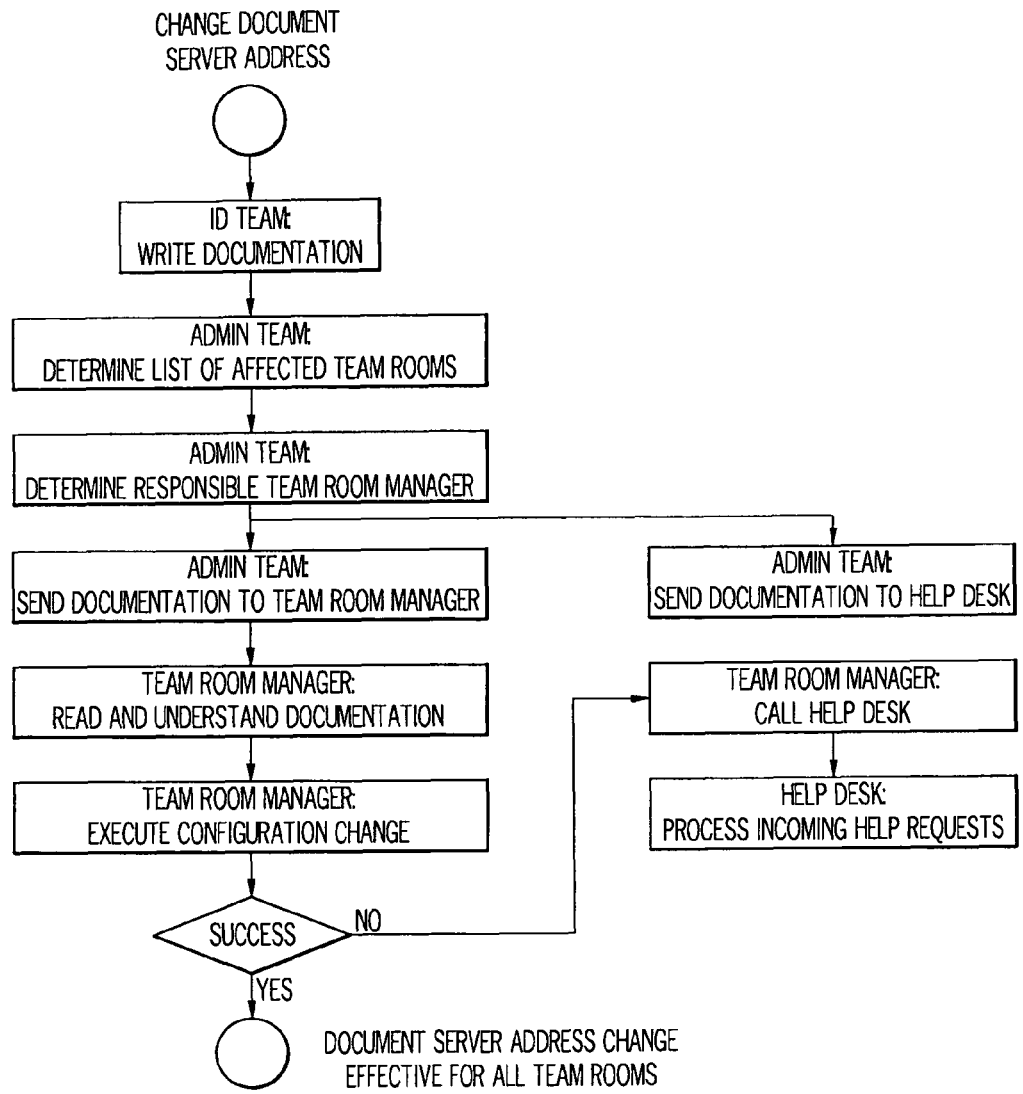
FIG. 3 illustrates a prior art control flow showing the basic steps in a prior art method for managing POV information for a composite application.
Figure 4:
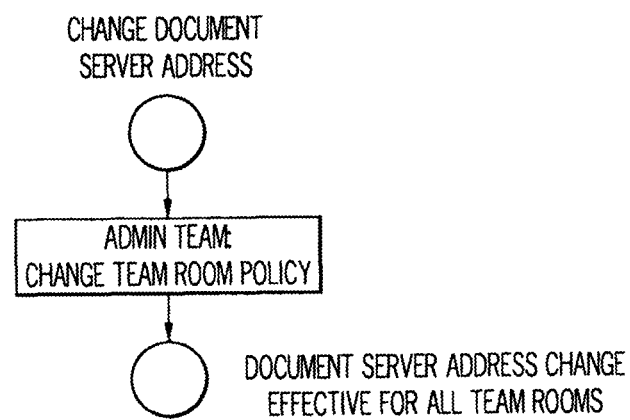
FIG. 4 depicts an illustrative control flow showing a basic step in an embodiment of the inventional method for managing POV information for a composite application.

With general reference to the figures and with special reference now to FIG. 4, there is illustrated a control flow showing a basic step in an embodiment of the inventional method for managing POV information for composite applications. In this step, the policy for the exemplary composite application "teamroom" is changed such that a new server address is stored in a particular policy, i.e., that one which cares to describe all information relating to document servers.

An example is used to clarify this inventional method. Assume, for example, that a network administrator is obliged to control the mail quota for a shared mailbox being part of a discussion forum implemented as a composite application. The mail quota shall be 100 MB for applications managed by managers and 50 MB for applications managed by non-managers. If the application is of category "Problem Tracking" the mail quota shall be 200 MB independent of who is managing of the application.

To achieve this, the administrator sets up three policies to hold the respective mail-quota values:
1) the Manager-Mail-Policy;
2) the Non-Manager-Policy; and
3) the Problem-Tracking-Mail-Policy In addition to the administrator sets up respective rules, for example, such as:
rule1: "if application.manager.isManager==true, then use the Manager-Mail-Policy";
rule2: "if application.manager.isManager==false, then use the Non-Manager-Mail-Policy";
rule3: "if application.category=="Problem Tracking", then use Problem-Tracking-Mail-Policy";
rule4: "rule3 takes precedence over rule2"; and
rule5: "rule3 takes precedence over rule1".

As a result, not a single discussion forum composite application, but instead all new discussion forums being instantiated from the discussion forum template, automatically get the correct mail-quota value assigned. If the mail-quota requirements change over time, e.g., applications run by executives shall have 400 MB mail-quota, it is possible to just add additional rules to achieve that for applications being instantiated in the future.

To achieve a dynamic adjustment of existing composite applications, respective "policy to parameter mappings" are introduced. Examples are as follows:
rule6: "if Manager-Mail-Policy is changed, then update all applications where application.manager.isManager==true";
rule7: "if Non-Manager-Mail-Policy is changed, then update all applications where application.manager.isManager==false";
rule8: "if Problem-Tracking-Mail-Policy is changed, then update all application where application.category=="Problem Tracking";
rule9: "rule 7 takes precedence over rule 5"; and
rule10: "rule 7 takes precedence over rule 6".

In this case, changing the Manager-Mail-Policy to define mail-quota to be 300 MB, will result in all discussion forms being run by Managers except for those of the "Problem Tracking" category that will automatically be updated. In this scenario, the mapping to and from policies happens to be symmetric, but it should be noted that this is not a prerequisite.

It is worth noting that such rules can be advantageously established without the need to modify the existing application templates in any way, which allows using this approach even for templates provided by $3^{rd}$ parties.

Figure 5:
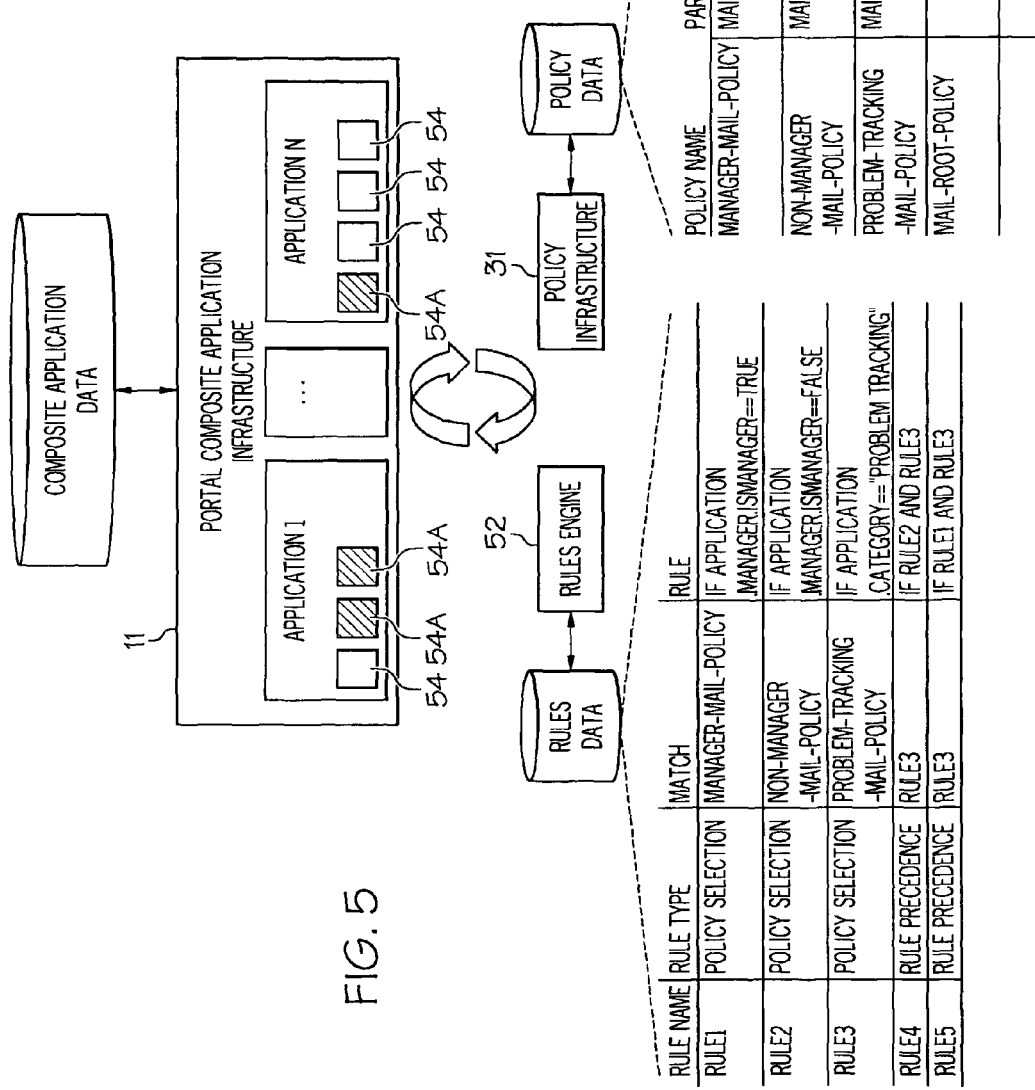
FIG. 5 depicts illustrative structural components involved in a policy management according to an embodiment of the present invention.

FIG. 5 illustrates structural components involved in policy management according to an embodiment of the present invention. The composite application infrastructure 11 represents a portal composite application infrastructure that manages the individual application definition and template data. The policy infrastructure 31 holds the corporate configuration data, which can be arranged in a hierarchy of policy sheets. Furthermore, the policy infrastructure 31 is responsible to generate events on policy value updates that can be consumed by policy client components by implementing a "publish-subscribe" programming pattern. Each policy defines one or more composite application parameters 54. In FIG. 5, some of the application parameters, denoted with reference 54A, are automatically configured composite application parameters according to this inventional embodiment The rules engine 52 is responsible and thus implements logic for mapping individual data sets managed by the policy infrastructure to individual points of variability exposed to the individual composite applications running in the portal composite application infrastructure. Exemplary datasets for rules data and policy data are given in the bottom section of FIG. 5.

Referring to the mail quota example there would be five rules stored in the rules data database mapping the individual policy data sets to individual composite applications, i.e., the points of variability exposed by those applications.

The actual configuration data is stored in the Policy Data database managed by the policy component.

According to the mail quota example in the bottom section of FIG. 5, there are at least three policies defined for "manager managed team rooms", "non-manager managed team rooms" and "problem tracking team rooms". Each policy defines the composite application parameters "mail-quota", "mail-server", and "default-client". Note that the actual effective value set can be defined by resolving the hierarchical relationship between the individual policies, i.e., the Mail-Root-Policy and the individual other mail policies.

Figure 6:
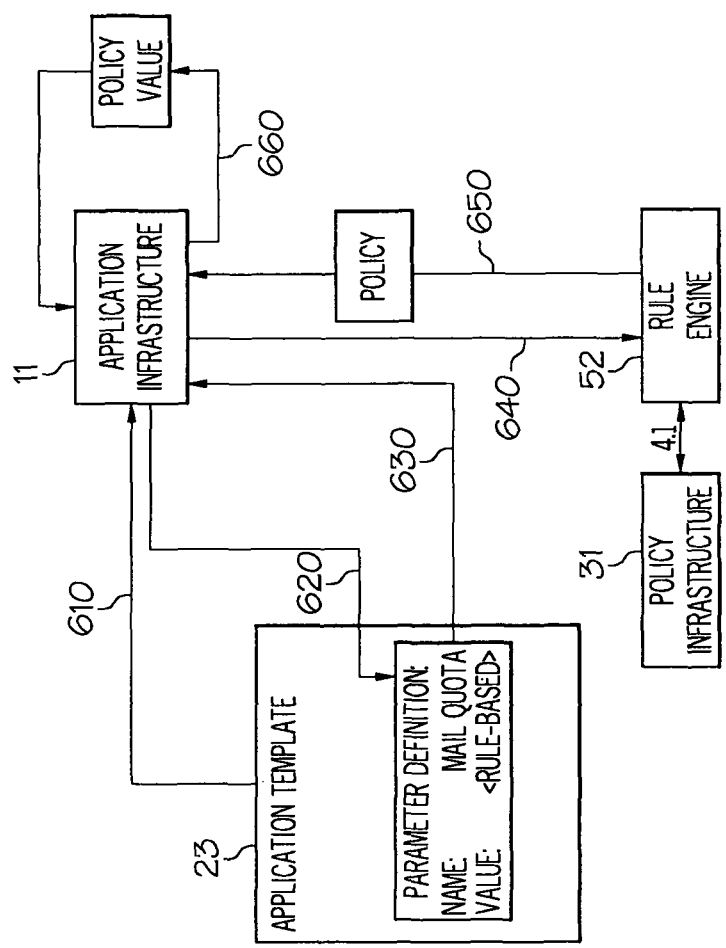
FIG. 6 is an interaction diagram illustrating the interoperation of components used according to an embodiment of the present invention, in which the parameter definition is stored in the application template.

FIG. 6 is an interaction diagram illustrating the interoperation of components 11, 23, 31 and 52 used according to an embodiment of the present invention in a first implementation variant, in which the parameter definition is stored in the application template 23. In this case, the parameter definition stored in the application template 23 indicates that the parameter values for this parameter definition shall be assigned using the external rules engine 52. The composite application infrastructure 11 uses the rules engine to retrieve the best matching policy instance based on the given application context information. A sample implementation implements the following steps, which are enumerated also in the drawing:

Step 610: The application template is read by the application infrastructure during application instantiation.

Step 620: The parameter definition mail_quota (exemplary POV) is identified.

Step 630: The parameter value is identified to be rule_based which means the actual value for this parameter will not be queried from the user instantiating the application, but needs to be retrieved using the rules engine.

Step 640: The application infrastructure 11 issues the query for the best matching policy. The query is propagating the following context information: user ID, template category ID, template ID and parameter name.

Step 650: The rules engine 52 returns the value set of that policy that resulted in a best match according to the context information associated to the query and the rule basis stored in the rules database.

Step 660: The application infrastructure 11 extracts the actual value from the policy value set returned by the rules engine and assigns this value to the mail_quota parameter.

Figure 7:
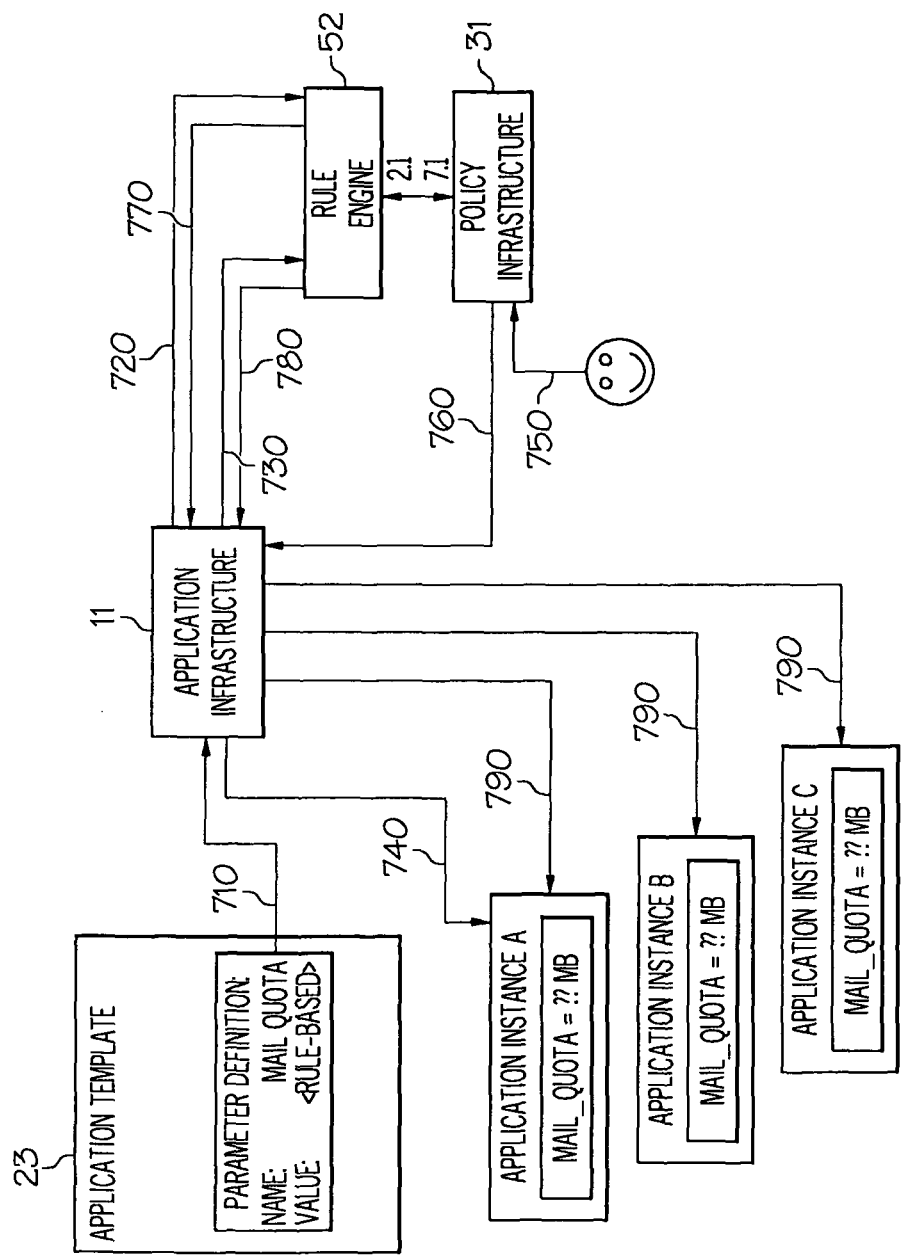
FIG. 7 is an interaction diagram illustrating the interoperation of components used according to an embodiment of the present invention, in which individual policies are mapped to individual application parameters through a rules engine.

FIG. 7 is an interaction diagram illustrating the interoperation of components used according to an embodiment of the present invention for the case in which individual policies are mapped to individual application parameters through a rules engine.

This can be used in parallel or in addition to individual parameters being mapped policies as described above. If both directions are used, a bidirectional mapping between application parameters and policy values can be established. The flow in a bidirectional mapping is executed as follows:

Step 710: The application template is read by the application infrastructure during application instantiation. The parameter definition for the mail_quota parameter identifies this parameter to be resolved using the rules engine.

Step 720: The application infrastructure issues the query for the best matching policy. The query is propagating the following context information: user ID, template category ID, template ID and parameter name (mail_quota).

Step 730: The rules engine extracts the policy value from that policy that resulted in a best match according to the context information associated to the query and the rule basis stored in the rules database.

Step 740: The application infrastructure assigns this value to mail_quota parameter of the application.

Step 750: After some time the administrator wants to change the mail quota (e.g., in the Manager-Mail-Quota-Policy).

Step 760: The application infrastructure is notified about the change in this policy by the policy infrastructure. In order to capture the events generated by the policy infrastructure, the composite application infrastructure implements the PolicyValueChanged event listener interface exposed by the policy component and registers itself as a listener for such events. The policy component in turn, notifies all registered listeners through the PolicyValueChanged interface of all updates to any policy values.

Step 770: The application infrastructure calls the rule engine to determine the matching parameter definitions. The query is propagating the following context information:
  policy category ID;
  policy ID; and
  parameter name (e.g., Mail-Policies, Manager-Mail-Policy, mail_quota).
  The result of that query is the set of parameters contained in potentially a multitude of composite application instances that need to be updated with the new value.

Step 780: The rule engine returns this set of parameter definitions to be updated.

Step 790: The application infrastructure updates the values of all parameter definitions returned by the rules engine.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of various aspects of the invention has been presented for purposes of illustration and description. It is not intended to be exhaustive or to limit the invention to the precise form disclosed, and many modifications and variations are possible. Such modifications and variations that may be apparent to a person skilled in the art are intended to be included within the scope of the invention as defined by the accompanying claims.

The invention claimed is:

1. A method for automatic configuration of a portal composite application comprising a portal composite application infrastructure, wherein configuration parameters are managed within a composite application interface of the portal, wherein the interface defines a runtime behavior of instances of the composite application within a predetermined range of variability, and wherein each parameter defines a respective point of variability, the method comprising:
  storing a collection of parameter values for each of the points of variability;
  defining a policy infrastructure including a plurality of policies cooperating with the composite application via a rules engine and having read access to the collection of parameter values defined by the policies;
  invoking the rules engine containing a plurality of rules after or at instantiation time of the composite application, in response to an identification of a parameter definition in an application template, for selecting a best matching policy in the policy infrastructure;
  applying the best matching policy to yield a configuration parameter value;
  including the configuration parameter value into a control for an instance of the composite application;
  automatically configuring the instance of the composite application with the included configuration parameter value;
  updating at least one policy in the policy infrastructure based on an updated parameter value; and updating, in response to the updating of the at least one policy, the rules in the rules engine and the instance of the composite application, to reflect the updated parameter value.

2. The method according to claim 1, wherein a predetermined policy component provides a value for a respective configuration parameter.

3. The method according to claim 1, wherei the plurality of policies are ordered by a hierarchical category scheme.

4. The method according to claim 1, wherein individual policies are put under dedicated and centralized access control protection.

5. The method according to claim 4, wherein the central access control protection is decoupled from individually affected composite application instances.

6. An electronic data processing system for automatic configuration of a portal composite application comprising a portal composite application infrastructure, wherein configuration parameters are managed within a composite application interface of the portal, wherein the interface defines a runtime behavior of instances of the composite application within a predetermined range of variability, and wherein each parameter defines a respective point of variability, the system comprising:
- a policy data storage for storing a collection of parameter values for each of the points of variability;
- a policy infrastructure including a plurality of policies cooperating with the composite application via a rules engine and having read access to the collection of parameter values defined by the policies;
- a component for invoking the rules engine containing a plurality of rules after or at instantiation time of the composite application, in response to an identification of a parameter definition in an application template, for selecting a best matching policy in the policy infrastructure;
- a component for applying the best matching policy to yield a configuration parameter value;
- a component for including the configuration parameter value into a control for an instance of the composite application;
- a component for automatically configuring the instance of the composite application with the included configuration parameter value;
- a component for updating at least one policy in the policy infrastructure based on an updated parameter value; and
- a component for updating, in response to the updating of the at least one policy, the rules in the rules engine and the instance of the composite application, to reflect the updated parameter value.

7. The system according to claim 6, wherein a predetermined policy component provides a value for a respective configuration parameter.

8. The system according to claim 6, wherein the plurality of policies are ordered by a hierarchical category scheme.

9. The system according to claim 6, wherein individual policies are put under dedicated and centralized access control protection.

10. The system according to claim 9, wherein the central access control protection is decoupled from individually affected composite application instances.

11. A computer program product stored on a non-transitory computer readable medium for automatic configuration of a portal composite application comprising a portal composite application infrastructure, wherein configuration parameters are managed within a composite application interface of the portal, wherein the interface defines a runtime behavior of instances of the composite application within a predetermined range of variability, and wherein each parameter defines a respective point of variability, the computer readable medium comprising program code for causing a computer system to:
- store a collection of parameter values for each of the points of variability;
- define a policy infrastructure including a plurality of policies cooperating with the composite application via a rules engine and having read access to the collection of the parameter values defined by the policies;
- invoke the rules engine containing a plurality of rules after or at instantiation time of the composite application, in response to an identification of a parameter definition in an application template, for selecting a best matching policy in the policy infrastructure;
- applying the best matching policy to yield a configuration parameter value;
- include the configuration parameter value into a control for an instance of the composite application;
- automatically configure the instance of the composite application with the included configuration parameter value;
- updating at least one policy in the policy infrastructure based on an updated parameter value; and
- updating, in response to the updating of the at least one policy, the rules in the rules engine and the instance of the composite application, to reflect the updated parameter value.

12. The computer program product according to claim 11, wherein a predetermined policy component provides a value for a respective configuration parameter.

13. The computer program product according to claim 11, wherein the plurality of policies are ordered by a hierarchical category scheme.

14. The computer program product according to claim 11, wherein individual policies are put under dedicated and centralized access control protection.

15. The computer program product according to claim 14, wherein the central access control protection is decoupled from individually affected composite application instances.

* * * * *